(12) United States Patent
Worrell et al.

(10) Patent No.: US 7,473,032 B2
(45) Date of Patent: Jan. 6, 2009

(54) SYSTEM AND METHOD FOR ENABLING TEMPERATURE MEASUREMENT USING A PYROMETER AND PYROMETER TARGET FOR USE WITH SAME

(75) Inventors: Michael J. Worrell, Oxford, PA (US); James Jay Cress, Mishawaka, IN (US)

(73) Assignee: Honeywell International Inc., Morristown, NJ (US)

( * ) Notice: Subject to any disclaimer, the term of this patent is extended or adjusted under 35 U.S.C. 154(b) by 139 days.

(21) Appl. No.: 11/477,943

(22) Filed: Jun. 30, 2006

(65) Prior Publication Data

US 2008/0002756 A1    Jan. 3, 2008

(51) Int. Cl.
*G01J 5/48* (2006.01)

(52) U.S. Cl. .............. 374/129; 374/E15.002; 374/208

(58) Field of Classification Search ............. 374/1–2, 374/120–121, 126, 137, 163, 166–167, 189, 374/129
See application file for complete search history.

(56) References Cited

U.S. PATENT DOCUMENTS

| | | | |
|---|---|---|---|
| 4,070,542 A | 1/1978 | Miles et al. | |
| 4,144,758 A | 3/1979 | Roney | |
| 4,276,493 A | 6/1981 | Srinivasa et al. | |
| 4,432,657 A | 2/1984 | Rudzki et al. | |
| 4,502,792 A | 3/1985 | Hunsucker | |
| 4,840,496 A | 6/1989 | Elleman et al. | |
| 4,883,364 A * | 11/1989 | Astheimer | 374/129 |
| 5,001,327 A * | 3/1991 | Hirasawa et al. | 219/390 |
| 5,098,198 A * | 3/1992 | Nulman et al. | 374/121 |
| 5,316,385 A | 5/1994 | Thomas | |
| 5,690,429 A | 11/1997 | Ng | |
| 6,188,050 B1 * | 11/1997 | Ng | 374/1 |
| 5,938,335 A * | 8/1999 | Yam | 374/124 |
| 5,988,874 A * | 11/1999 | Rohner | 374/2 |
| 6,032,382 A * | 3/2000 | Matsumoto et al. | 34/78 |
| 6,200,634 B1 * | 3/2001 | Johnsgard et al. | 427/248.1 |
| 6,207,937 B1 * | 3/2001 | Stoddard et al. | 219/497 |
| 6,610,968 B1 * | 8/2003 | Shajii et al. | 219/497 |
| 6,840,671 B2 | 1/2005 | Barron, Jr. et al. | |
| 2003/0231694 A1* | 12/2003 | Ohsawa | 374/129 |
| 2004/0012775 A1* | 1/2004 | Kinney et al. | 356/237.2 |
| 2006/0094261 A1* | 5/2006 | Frisella et al. | 438/800 |

FOREIGN PATENT DOCUMENTS

DE    102 20 639 A1    12/2005
JP    1-105530    4/1989

* cited by examiner

*Primary Examiner*—Edward Lefkowitz
*Assistant Examiner*—Bret Adams
(74) *Attorney, Agent, or Firm*—Birch, Stewart, Kolasch & Birch, LLP

(57) ABSTRACT

A system for enabling the measurement of a temperature in a furnace (30, 48) using a pyrometer (38) that includes a pallet support (32, 52) for supporting a pallet (40, 50) a given distance (c) above a furnace floor (31) and a pyrometer target (10, 60, 80) that includes a support member (12, 62, 82) and a target member (14, 68) separable from said support member (12, 62, 82) where the support member (12, 62, 82) has a height less than the given distance (c).

17 Claims, 3 Drawing Sheets

SYSTEM AND METHOD FOR ENABLING TEMPERATURE MEASUREMENT USING A PYROMETER AND PYROMETER TARGET FOR USE WITH SAME

FIELD OF THE INVENTION

The present invention is directed toward a system for and method of enabling the measurement of a temperature in a furnace using a pyrometer, and more specifically, toward a system for enabling the measurement of a temperature in a furnace using a pyrometer which system includes a pyrometer target having a target member separable from a support member and to a method of using the pyrometer target in a furnace.

BACKGROUND OF THE INVENTION

Optical pyrometers are commonly used to measure temperatures in environments that are too hot to be measured by other temperature measuring devices such as thermometers and thermocouples. Some materials, including graphite and various metals, change color as they are heated, and therefore the temperature of a material can be estimated from the observed color. An optical pyrometer detects the color of an object being heated or the color of a surface in a furnace and correlates this color with a particular temperature. The optical pyrometer is generally mounted at a location where temperatures are not extreme and focused on a portion of a furnace or a material being treated in a furnace to measure color. Some furnaces, for example, may include windows through which a pyrometer can view the color of a material therein. In this manner, very high temperatures can be measured without exposing a measuring device to extreme conditions.

The color measured by a pyrometer is dependent on the material being heated. Therefore, if the pyrometer is focused on a product being processed in a furnace, the relationship between color and temperature for each product processed must be known. To avoid this difficulty and obtain consistent temperature measurements, the pyrometer may be aligned with either a target made of a known material or with a specific portion of a furnace so that repeatable temperature measurements can be obtained.

Some furnace arrangements lend themselves to the mounting of a pyrometer target on a wall of the furnace where the target can remain without interfering with product loading and unloading. Other known furnaces, however, have limited interior space, and therefore any pyrometer target used must be placed in the furnace after the product is loaded into the furnace and removed from the furnace before the product can be removed from the furnace. In one known process, materials to be processed are placed on a pallet, the pallet is placed on a support table having rollers, and the pallet is rolled from support table rollers onto rollers in a furnace. A large and therefore heavy graphite door is placed between the furnace door and the pallet, and the graphite door is then used as a pyrometer target. Smaller targets can be used, but the target must still generally have a large enough targeting area to allow a pyrometer to be readily aimed thereat and be tall enough to provide a temperature reading in a central portion of a furnace away from the furnace floor and to be visible through a window in a furnace door or wall. Since pyrometer targets may be made from dense materials such as steel or graphite, suitable targets are difficult to move. This increases the time required for loading and unloading a furnace and increases the likelihood of worker injury. It would therefore be desirable to provide a system and method for enabling the measurement of a temperature in a furnace that includes a relatively easy to use pyrometer target.

SUMMARY OF THE INVENTION

These problems and others are addressed by the present invention, a first feature of which is a system for enabling the measurement of a temperature in a furnace using a pyrometer which system includes a pallet support for supporting a pallet a given distance above a furnace floor and a pyrometer target comprising a support member and a target member. The target member is separable from the support member, and the support member has a height less than the given distance.

Another feature of the invention is a method of enabling a temperature measurement in a furnace using a pyrometer that involves providing a pallet support in the furnace for supporting a pallet a given distance above a floor of the furnace and providing a pyrometer target comprising a support member and a target member separable from the support member. The pyrometer target has a height greater than the given distance, and the support member has a height less than the given distance. The support member is placed in the furnace, and a pallet is moved into the furnace over the support member and onto the pallet support. After moving the pallet over the support member, the pyrometer target is placed on the support member, and a pyrometer is directed at the pyrometer target member.

Yet another feature of the invention is a system for enabling the measurement of a temperature in a furnace using a pyrometer that includes a pallet support comprising a plurality of rollers for supporting a pallet a given distance above a furnace floor and a pyrometer target. The pyrometer target includes a support member having an upper surface and a height less than the given distance and a target member separable from the support member and comprising a base member supported by the support member upper surface and a targeting portion supported by the base member. A thickness of the base member is selected to be less than or equal to the difference between the given distance and a height of the support member.

BRIEF DESCRIPTION OF THE DRAWINGS

These aspects and features of embodiments of the invention will be better understood after a reading of the following detailed description of embodiments of the invention together with the accompanying drawings wherein.

DETAILED DESCRIPTION

Figure 1:
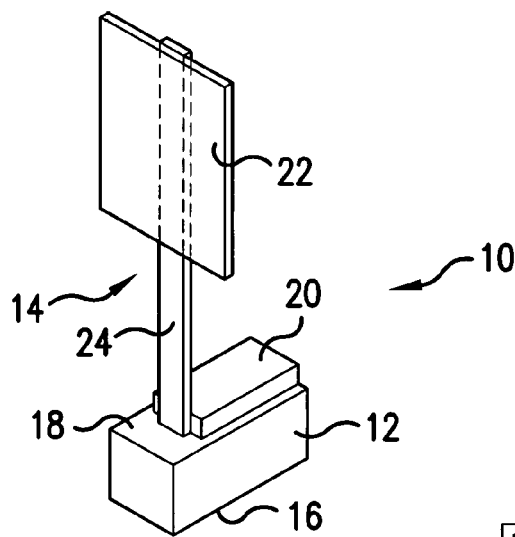
FIG. 1 is a perspective view of a pyrometer target comprising a target member and a support member.

Referring now to the drawings, wherein the showings are for the purpose of illustrating preferred embodiments of the invention only and not for the purpose of limiting same, FIG. 1 illustrates a pyrometer target 10 that comprises a support member 12 and a target member 14. Support member 12 has a bottom surface 16 and a top surface 18 and a height equal to the distance between bottom surface 16 and top surface 18. Target member 14 comprises a base member 20, a targeting portion 22, and a spacer 24 spacing targeting portion 22 from base member 20. In this embodiment, the width of targeting portion 22 is greater than the width of spacer 24. Also in this embodiment, support member 12 and target member 14 are formed from graphite, and base member 20, targeting portion 22 and spacer 24 are interconnected in a manner suitable for joining graphite elements. Targeting portion 22 in this embodiment is square, but the invention is not limited to the use of a square targeting portion. Targeting portion 22 should be large enough to permit a pyrometer to be aimed at the targeting portion, but small enough so as to avoid unnecessarily increasing the weight of target member 14. Likewise, the size and shape of spacer 24 is based on the required location of targeting portion 22 relative to a furnace in which it is used and the location of a pyrometer that will be aimed at targeting portion 20.

Figure 2:
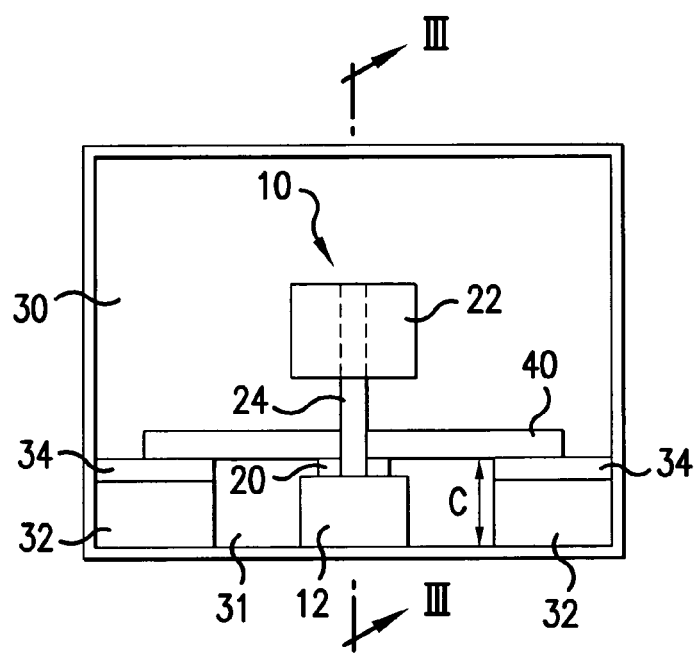
FIG. 2 is a front elevational view of a system comprising a first embodiment of a pallet support in a furnace supporting a pallet together with the pyrometer target of FIG. 1.
Figure 3:
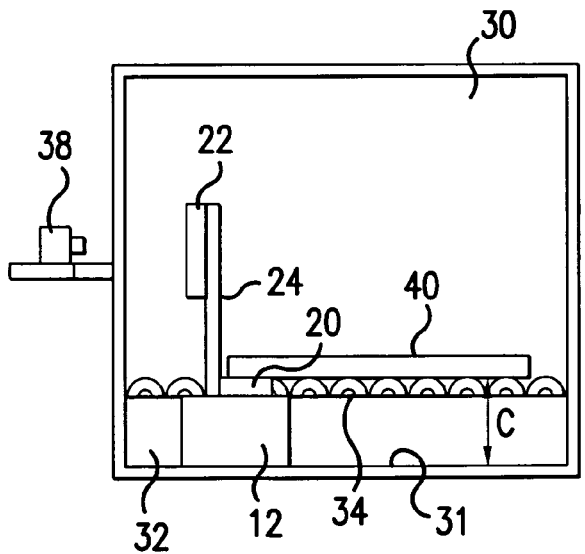
FIG. 3 is a sectional elevational view taken along line III-III of FIG. 2.

FIGS. 2 and 3 illustrate a furnace 30 that includes a floor 31 and first and second pallet supports 32 on floor 31 which each comprise a plurality of support rollers 34 for supporting a pallet, such as pallet 40, in furnace 30. Pallet 40 may be formed, for example, of a sheet of graphite large enough and strong enough to support the weight of articles (not shown) that are to be moved into furnace 30. Pallet supports 32 are configured to support pallet 40 a given distance c above the floor of the furnace. A pyrometer 38 for use with pyrometer target 10 is illustrated in FIG. 3.

To use pyrometer target 10 to measure the temperature of furnace 30, support member 12 is placed on the floor 31 of furnace 30 between first and second pallet supports 32, preferably toward the front or loading side of furnace 30. After this initial placement, support member 12 can be left in furnace 30 for multiple process cycles. Support member 12 could alternately be permanently attached to the floor 31 of furnace 30, but greater flexibility of furnace use is provided if support member 12 is removable from furnace 30. With support member 12 in place, a pallet 40, supporting articles (not shown) to be treated, is moved into furnace 30 over support member 12 and onto rollers 34 of first and second pallet supports 32. Prior to entering furnace 30, pallet 40 may, for example, be supported by a support table (not shown) which may be moved to the furnace entrance with pallet 40 generally level with pallet supports 32 so that the pallet 40 can be kept generally level while being rolled off the support table and onto rollers 34 of first and second pallet supports 32.

Because support member 12 has a height less than given distance c between the bottom of pallet 40 and the floor 31 of furnace 30, pallet 40 can move over and past support member 12 and onto pallet supports 32. The support table may, for example, have a height about the same as the given distance c so that a pallet 40 on the support table can move in the plane of the pallet from the support table into furnace 30. This relationship between the given distance or clearance c and the height of support member 12 allows a portion of pyrometer target 10 to remain in furnace 30 between uses.

With pallet 40 positioned in furnace 30, target member 14 of pyrometer target 10 is placed on support member 12. The combined height of support member 12 and target member 14 is greater than the given distance c. Base member 20 of target member 14 may be large enough to stably support target member 14 on support member 12; however the size and weight of target member 14 can be reduced by making base member 20 smaller than necessary for stable support and positioning an end of base member 20 under pallet 40 to that pallet 40 will help limit the movement of base member 20 and hold target member 14 in an upright position. Thus, the thickness of base member 20 should be slightly less than the difference between given distance c and the height of support member 12. With target 10 in this position, pyrometer 38 can be aimed at targeting portion 22 to determine the temperature of targeting portion 22 and hence the temperature of furnace 30. To remove the pallet from the furnace, the process is reversed Much of the mass of pyrometer target 10, namely, the amount represented by support portion 12, can be left in the furnace 30 between process cycles, and therefore the mass of the target member 14 that must be moved between process cycles is kept relatively low. A second pyrometer target can be used at the other end of pallet 40, and more than one pallet 40 may be loaded in furnace 30 during a furnace cycle without exceeding the scope of the present invention.

Figure 4:
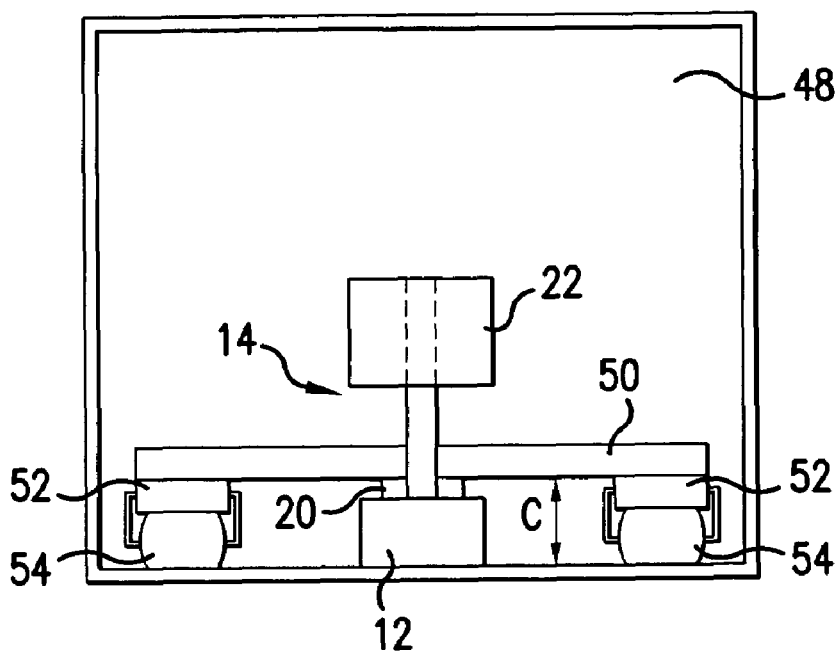
FIG. 4 is second embodiment of a pallet support in a furnace supporting a pallet together with the pyrometer target of FIG. 1.

The above embodiment is useful in a furnace 30 that includes pallet supports 32. If pallet supports 32 are not present in a furnace, such as furnace 48 illustrated in FIG. 4, a second embodiment of the present invention may be used. In this embodiment, a pallet 50 is mounted on or attached to movable pallet supports 52 which include rollers 54. Pallet 50 is supported on pallet supports 52 and rollers 54 to provide a given distance c between the bottom of pallet 50 and the surface on which rollers 54 roll. In this manner, pallet 50 with articles (not shown) supported thereon, can be rolled into and removed from furnace 48 without requiring the removal of pyrometer target support member 12 (which has a height less than the given distance c). Pyrometer target 14 is retained on support member 12 and used as described above in connection with the first embodiment.

Figure 5:
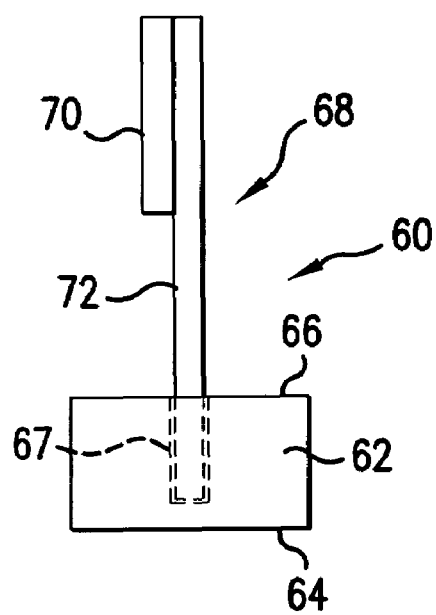
FIG. 5 is a side elevational view of a second embodiment of a pyrometer target.

FIG. 5 illustrates a different embodiment of a pyrometer target that can be used in a manner similar to the pyrometer target 10 described above. Pyrometer target 60, illustrated in FIG. 5, includes a pyrometer support member 62 having a bottom 64 and a top 66 that includes an opening 67. A pyrometer target member 68 includes a targeting portion 70 and a spacer 72 for spacing targeting portion 70 from support member 62. Spacer 72 is placed in opening 67 to support target member 68 in support member 62. The height of support member 62, the distance between bottom 64 and top 66, is less than the given distance c between the bottom of a pallet supported in a furnace and the floor of the furnace. Pyrometer target 60 can therefore used in a similar manner as pyrometer target 10 discussed above with support member 62 placed into a furnace before a pallet is moved into the furnace and target member 68 is inserted into support member 62 after a pallet has cleared the support member 62 and moved into place in the furnace.

Figure 6:
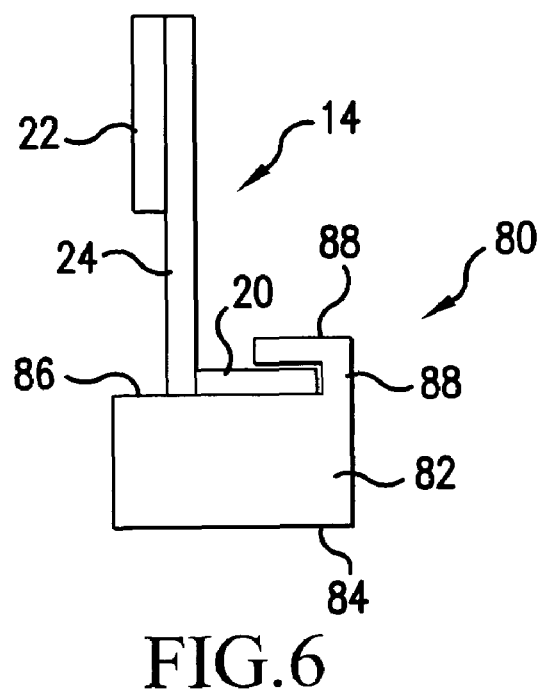
FIG. 6 is a side elevational view of a third embodiment of a pyrometer target.

FIG. 6 illustrates a further embodiment of a pyrometer target. Pyrometer target 80 includes a support member 82 having a bottom 84, a top 86 and a projection 88 projecting along top 86 having a projection top 88. The distance between bottom 84 and projection top 88 is less than given distance c, allowing a pallet to clear support member 82 when moving into and out of a furnace. Projection 86 is configured to engage a portion of the base member 20 of a pyrometer target member 14 to help hold target member 14 on support member 82.

Figure 7:
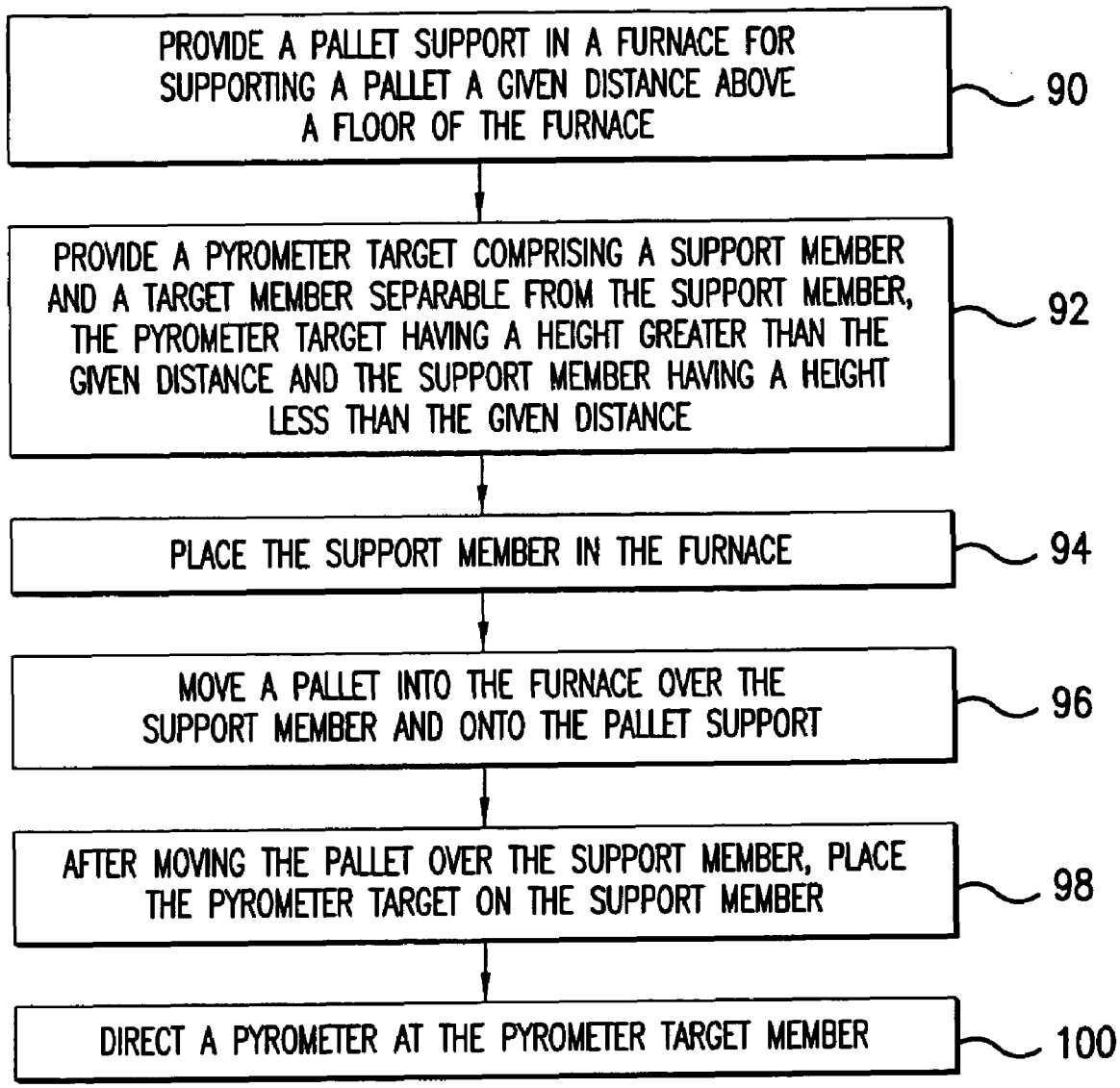
FIG. 7 is a flow chart illustrating a method according to an embodiment of the present invention.

FIG. 7 outlines a method according to an embodiment of the present invention that includes a step 90 of providing a pallet support in a furnace for supporting a pallet a given distance above a floor of the furnace, a step 92 of providing a pyrometer target comprising a support member and a target member separable from the support member, the pyrometer target having a height greater than the given distance and the support member having a height less than the given distance, a step 94 of placing the support member in the furnace and a step 96 of moving a pallet into the furnace over the support member and onto the pallet support. The method further includes a step 98 of after moving the pallet over the support member, placing the pyrometer target on the support member and a step 100 of directing a pyrometer at the pyrometer target member.

The present invention has been described herein in terms of several embodiments. Additions and modifications to these embodiments will become apparent to those skilled in the relevant arts upon a reading of the forgoing disclosure. It is intended that all such obvious additions and modifications form a part of the present invention to the extend that they fall within the scope of the several claims appended hereto.

We claim:

1. A system for enabling the measurement of a temperature in a furnace using a pyrometer comprising:
    a pallet support for supporting a pallet a given distance above a furnace floor;
    a pyrometer target comprising a support member and a target member separable from said support member, said support member having a height less than said given distance, wherein the target member is located on an upper surface of the support member, said pryometer target includes a base member supported by said support member upper surface and a targeting portion supported by said base member,
    daid pallet when supported on said pallet support limits movement between said pyrometer target member and said pryometer support member.

2. The system of claim 1 wherein said pallet support comprise a plurality of rollers.

3. The system of claim 1 wherein said pallet support comprises wheels on said pallet.

4. The system of claim 1 wherein said support member includes a space for receiving a portion of said pyrometer target.

5. The system of claim 1 wherein the upper surface of the support member includes a projection for engaging the pyrometer target. member upper surface and a targeting portion supported by said base member.

6. The system of claim 1 wherein said support member includes a space for receiving a portion of said pyrometer target base member.

7. The system of claim 1 wherein said pyrometer target member includes a spacer spacing said targeting portion from said base member.

8. The system of claim 7 wherein said targeting portion has a width greater than a width of said spacer.

9. The system of claim 1 wherein said base member has a thickness less than or equal to a difference between said support member height and said given distance.

10. The system of claim 7 wherein said base member and said spacer and said targeting portion are formed of graphite.

11. The system of claim 7 wherein said base member and said spacer and said targeting portion are planar.

12. The system of claim 7 wherein said targeting portion is perpendicular to said base member.

13. The system of claim 9 wherein the sum of the height of said support member and a height of said target member is greater than said given distance.

14. A method of enabling a temperature measurement in a furnace using a pyrometer comprising the steps of:
    providing a pallet support in the furnace for supporting a pallet a given distance above a floor of the furnace;
    providing a pyrometer target comprising a support member and a target member separable from the support member, the pyrometer target having a height greater than the given distance and the support member having a height less than the given distance;
    placing the support member in the furnace;
    moving a pallet into the furnace over the support member and onto the pallet support;
    after moving the pallet over the support member, placing the target member on the support member; and
    directing a pyrometer at the pyrometer target member.

15. The method of claim 14 including the additional step of positioning the pallet to hold the pyrometer target member on the pyrometer support member.

16. The method of claim 14 wherein said pallet support comprises a plurality of rollers and wherein said step of moving a pallet into the furnace over the support member comprises the step of rolling the pallet onto the plurality of rollers.

17. A system for enabling the measurement of a temperature in a furnace using a pyrometer comprising:
    a pallet support comprising a plurality of rollers for supporting a pallet a given distance above a furnace floor;
    a pyrometer target comprising a support member having an upper surface and having a height less than said given distance and a target member separable from said support member and comprising a base member supported by said support member upper surface and a targeting portion supported by said base member;
    wherein a thickness of said base member is less than or equal to the difference between the given distance and a height of said support member.

* * * * *